(12) United States Patent
Opferkuch

(10) Patent No.: US 8,313,688 B2
(45) Date of Patent: Nov. 20, 2012

(54) METHOD FOR IN-LINE HEAT EXCHANGER TUBE BRAZING

(75) Inventor: Frank Opferkuch, Unterensingen (DE)

(73) Assignee: Modine Manufacturing Company, Racine, WI (US)

( * ) Notice: Subject to any disclaimer, the term of this patent is extended or adjusted under 35 U.S.C. 154(b) by 239 days.

(21) Appl. No.: 12/670,018

(22) PCT Filed: Jul. 9, 2008

(86) PCT No.: PCT/EP2008/005584
§ 371 (c)(1),
(2), (4) Date: Apr. 21, 2010

(87) PCT Pub. No.: WO2009/026988
PCT Pub. Date: Mar. 5, 2009

(65) Prior Publication Data
US 2010/0219568 A1    Sep. 2, 2010

(30) Foreign Application Priority Data
Aug. 24, 2007  (DE) .......................... 10 2007 040 037

(51) Int. Cl.
*C21D 1/00*  (2006.01)
(52) U.S. Cl. ........... 266/44; 266/139; 228/101; 228/219
(58) Field of Classification Search .................... 266/44, 266/139; 228/101, 47.1, 219, 262.31–262.9
See application file for complete search history.

(56) References Cited

U.S. PATENT DOCUMENTS

| | | | | |
|---|---|---|---|---|
| 3,685,139 A | * | 8/1972 | Early et al. .................. | 228/234.1 |
| 3,752,642 A | * | 8/1973 | Early et al. ....................... | 432/66 |
| 4,678,643 A | * | 7/1987 | Fetzer ............................ | 422/175 |
| 5,147,083 A | * | 9/1992 | Halstead et al. ................ | 228/42 |
| 5,791,268 A | * | 8/1998 | Battles et al. ................. | 110/345 |
| 2003/0111459 A1 | | 6/2003 | Nishimura | |
| 2003/0222119 A1 | * | 12/2003 | Rogers et al. ................ | 228/47.1 |

FOREIGN PATENT DOCUMENTS

| | | |
|---|---|---|
| CA | 1295114 | 2/1992 |
| DE | 2254769 | 5/1974 |
| DE | 3402713 | 8/1985 |
| DE | 19953233 | 5/2001 |
| DE | 10227055 | 1/2003 |
| DE | 102006002932 | 7/2007 |
| DE | 102006033568 | 2/2008 |
| EP | 1029625 | 8/2000 |
| JP | 05-115934 | 5/1993 |
| WO | 2007054306 | 5/2007 |

OTHER PUBLICATIONS

Search Report for PCT/EP2008/005584, dated Nov. 3, 2008.

* cited by examiner

*Primary Examiner* — Scott Kastler
*Assistant Examiner* — Michael Aboagye
(74) *Attorney, Agent, or Firm* — Michael Best & Friedrich LLP

(57) ABSTRACT

An installation for soldering or for heat-treating workpieces (1) under a protective gas atmosphere, includes a workpiece transportation apparatus (2), an entrance (3) into the installation and an exit (4) out of the installation, a combustion-gas or heating-gas stream (B) which is conducted separately from the protective-gas stream (S) and brings the protective-gas stream (S) to operating temperature, and comprising an insulating means (5) which surrounds the installation. A considerable amount of energy is saved in that the combustion-gas or heating-gas stream (B) and the protective-gas stream (S) have approximately corresponding heat capacities and can be conducted through the installation in counterflow.

11 Claims, 4 Drawing Sheets

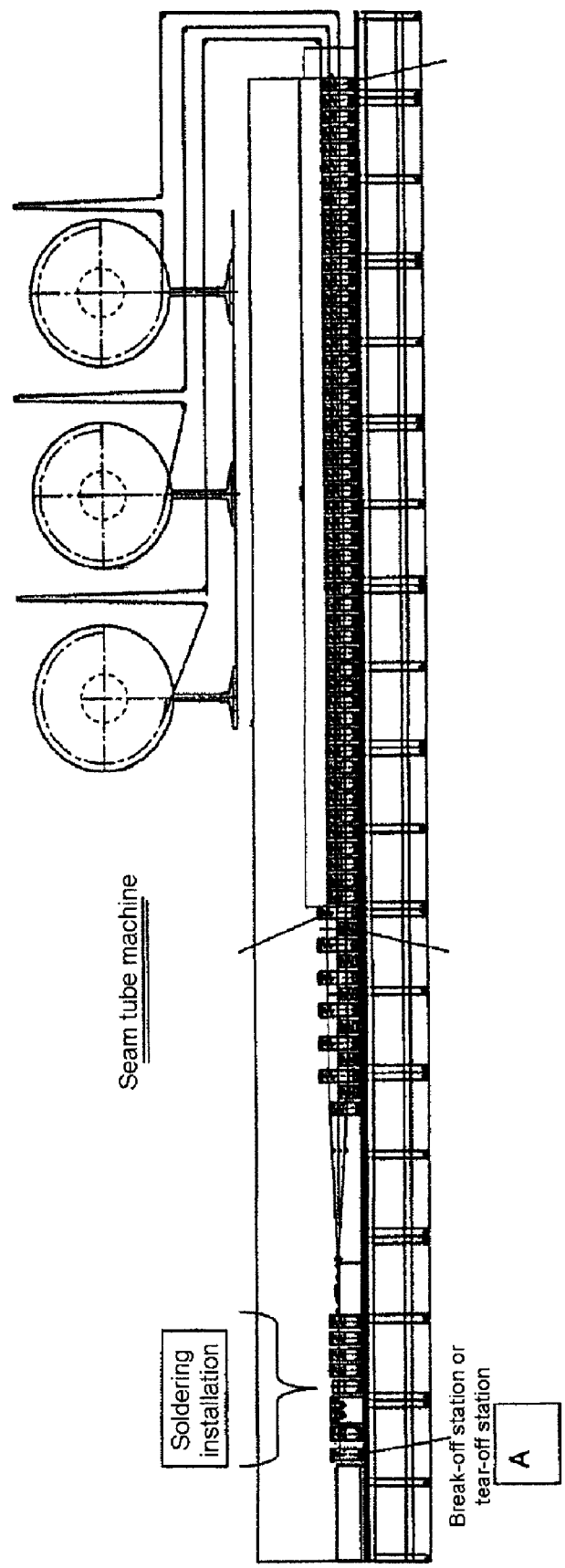

METHOD FOR IN-LINE HEAT EXCHANGER TUBE BRAZING

CROSS-REFERENCE TO RELATED APPLICATIONS

This patent application is a national stage filing under 35 U.S.C. 371 of International Application No. PCT/EP2008/005584, filed 9 Jul. 2008, and claims priority to German Patent Application No. 10 2007 040 037.5, filed 24 Aug. 2007, the entire contents of which are incorporated herein by reference.

BACKGROUND

The invention relates to an installation for soldering or for the heat treatment of workpieces in a protective gas atmosphere, having a workpiece transporting device, having an inlet into the installation and having an outlet out of the installation, having a combustion gas or heating gas flow which is conducted separately from the gas flow and which brings the gas flow to working temperature and having an insulation which surrounds the installation. The invention also relates to a corresponding process for soldering or for heat treatment.

DE 102 27 055B4 discloses a brazing process for joining components composed of aluminum or of an aluminum alloy. In said publication, it is considered to be advantageous to provide a hot gas, which may also be the protective gas, by means of electric heating. In this way, a reliable and fast brazing process is provided in said document. The division into two heating phases which is provided in said document ensures fast, economical heating and should supposedly lead to a lower overall energy input in relation to furnace heating—whatever may be meant by that term.

The significantly older DE 2 254 769 A has disclosed another soldering process and a soldering furnace for the flux-free soldering of aluminum workpieces in protective gas. In said document, too, the protective gas should preferably be electrically heated. The soldering furnace has a pre-heating chamber in which the workpieces are brought to approximately 500° C., a soldering chamber in which the soldering itself is carried out in protective gas, and inter alia also a cooling chamber.

SUMMARY OF THE INVENTION

A soldering installation includes a protective gas, which is nitrogen, and is brought to the soldering temperature by means of a combustion gas or heating gas. The known soldering plane is divided into zones, with a burner and a serpentine combustion gas line and also a perforated protective gas inflow line being provided for each zone. Furthermore, each zone contains a fan in order to ensure that the workpieces passing through are acted on at all sides with the protective gas which has been heated to soldering temperature.

As is known, an energy-saving way of generating hot flows can be realized by thermal coupling with exothermic reaction flows conducted in counterflow, as has been described for example in DE 199 53 233 A1 or in the significantly older DE 34 02 713 A1. Using such processes, synthesis products or even decomposition products are generated.

An energy-saving process for soldering may also be realized by virtue of an exothermic reaction between a substance present at the soldering point and constituents of a nitrogen atmosphere being generated at the soldering points. An example of this has been described in WO 2007/054306, but also even in significantly older publications.

JP 05-115934 discloses the soldering of heat exchanger tubes directly after the production of the tubes from endless sheet-metal strip. This type of production is economical. It is often referred to as "inline brazing". Said document however mentions merely an induction loop as a soldering station.

It is the object of the present invention to further develop an installation of the abovementioned type and a process for soldering or for the heat treatment of workpieces in order, inter alia, to reduce the energy input for the operation of the installation.

Because the fuel or combustion gas flow and the gas flow have matching heat capacities (heat absorption capacities/heat dissipation capacities) and can be conducted through the installation in counterflow configuration, significantly less energy is required for operating the installation. The gas flow is preferably a protective gas flow with inert properties. The heat absorption capacity of the protective gas flow plus the heat absorption capacity of the workpiece which is passing through the installation should correspond approximately to the heat dissipation capacity of the combustion gas flow. The protective gas flow flowing through the installation can be recirculated to the inlet—at any rate for re-use. The recirculation of the protective gas flow takes place in such a way that the temperature of the protective gas at the outlet of for example 60-100° C. is provided again at the inlet, aside from unavoidable losses. In physical terms, the recirculation line for the protective gas is provided with good heat insulation. If possible, said line may also be arranged within the insulation of the installation. If required, to compensate for losses, new protective gas is added to the recirculated protective gas flowing in at the inlet. The energy consumption is very considerably reduced also because practically no high-temperature waste gas and also no protective gas are discharged to the atmosphere.

In one refinement, a catalytic converter, for example a plate-type structure or a honeycomb structure coated with a suitable high-grade metal, is arranged in the flow path of the combustion gas, which catalytic converter has the effect of abruptly increasing the combustion temperature of the combustion gas, for example a methane-air mixture, at the inlet into the catalytic converter. The catalytic converter may also be a catalytically active substance. The catalytically active substance may for example be a suitable mixed oxide which is provided as a solid catalytic converter, that is to say without cumbersome coating of a substrate being required, such as is the case with a high-grade metal catalyst. As a result of the conversion of the combustion gas on the catalytic converter, the temperature of the combustion gas rises, which leads to the furnace wall also being heated. As a result of the hotter furnace wall, the protective gas, for example nitrogen, is then also heated, and on account of the intensive contact between the protective gas and the workpiece, the workpiece itself is ultimately also heated, during soldering expediently for example to a temperature above the solid state temperature of the solder which is used.

The rate of heat production of the exothermic reaction taking place on the catalytic converter is set by means of corresponding design of the catalytic converter and by means of quantity control of the combustion gas or control of the composition of said combustion gas. It is possible for the workpiece to be passed through the installation at higher speeds, which in many cases is desirable in order to accelerate the soldering.

The catalytic converter may extend over the entire heat-treatment region, for example the soldering region. It is also possible for a plurality of catalytic converters to be provided in said region. The position of the one or more catalytic converters may be varied in order to be able to adjust the installation so as to make the latter suitable, according to demand, for soldering or for the heat treatment of different products, that is to say in order to be able to adjust the installation in a manner coordinated with the requirements of the respective products, which are to be treated in such a way as to ensure quality. The requirements mentioned are dependent inter alia on the physical form of the products.

After leaving the catalytic converter, the burned combustion gas (waste gas) which is then present is cooled by means of continued heat exchange with the protective gas entering into the installation, and here, the protective gas is simultaneously pre-heated. The waste gas leaves the installation at a temperature in the range of, for example, 60-100° C.

The proposed installation is realized as a relatively slim tunnel composed of pipes arranged one inside the other preferably coaxially, which pipes can extend over a considerable length. The inlet and outlet openings of the installation at the end sides are therefore relatively small in relation to the length of the installation, thereby significantly assisting in maintaining the internal atmosphere in the soldering or heat treatment zone. The installation need not extend rectilinearly. It may for example be arranged in circular form or in loops in order to be adapted to local requirements of the production site. In the preferred embodiment, the pipes are—as mentioned—arranged coaxially, with an annular chamber between the inner pipe and outer pipe having approximately the same height all the way round. It is however also possible to provide embodiments which have a spacing between the longitudinal axis of the inner pipe and the longitudinal axis of the outer pipe, which pipes are therefore in this respect arranged not coaxially but rather merely one inside the other, and accordingly also do not have the abovementioned same height of the annular chamber all the way round. The installation may for example be used as a soldering installation for endless flat tubes which can be produced from sheet-metal strips. After the soldering of the endless flat tube, individual flat tubes of corresponding length are cut off and are used for the production of heat exchangers, for example. For this purpose, the soldering installation is coupled to a roll train which serves for the production of the endless flat tube by shaping. In the same way, however, it is also possible for subsections of the heat exchanger to be soldered, which subsections may be provided with corrugated ribs on one or on both wide sides of the flat tube. After soldering, subsections of corresponding length are cut off and assembled to form the heat exchanger.

The proposed process may be combined with measures known from the prior art in order to further reduce energy consumption.

The invention is explained on the basis of an exemplary embodiment, for which purpose reference is made to the appended drawings.

BRIEF DESCRIPTION OF THE DRAWINGS

FIG. 6 shows a roll train in principle, on which an endless flat tube, for example as per FIG. 4, is produced.

DETAILED DESCRIPTION

Figure 1:
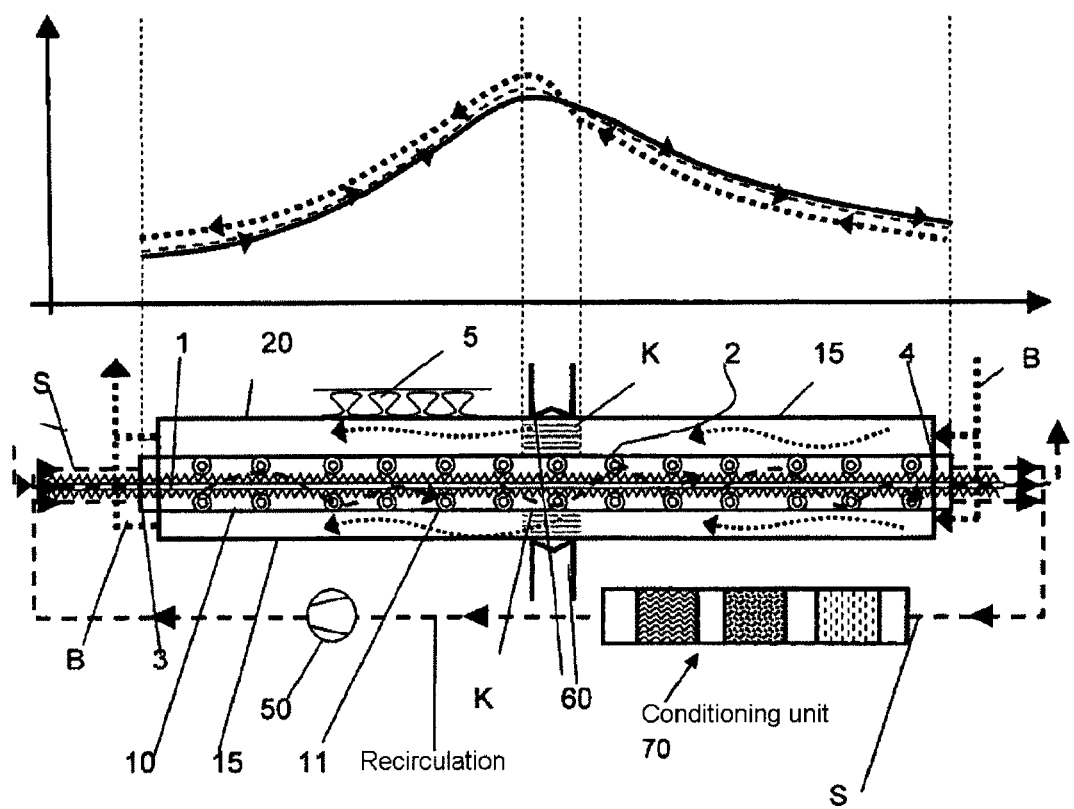
FIG. 1 shows a first principle diagram of an installation, with associated temperature profile.
Figure 2:
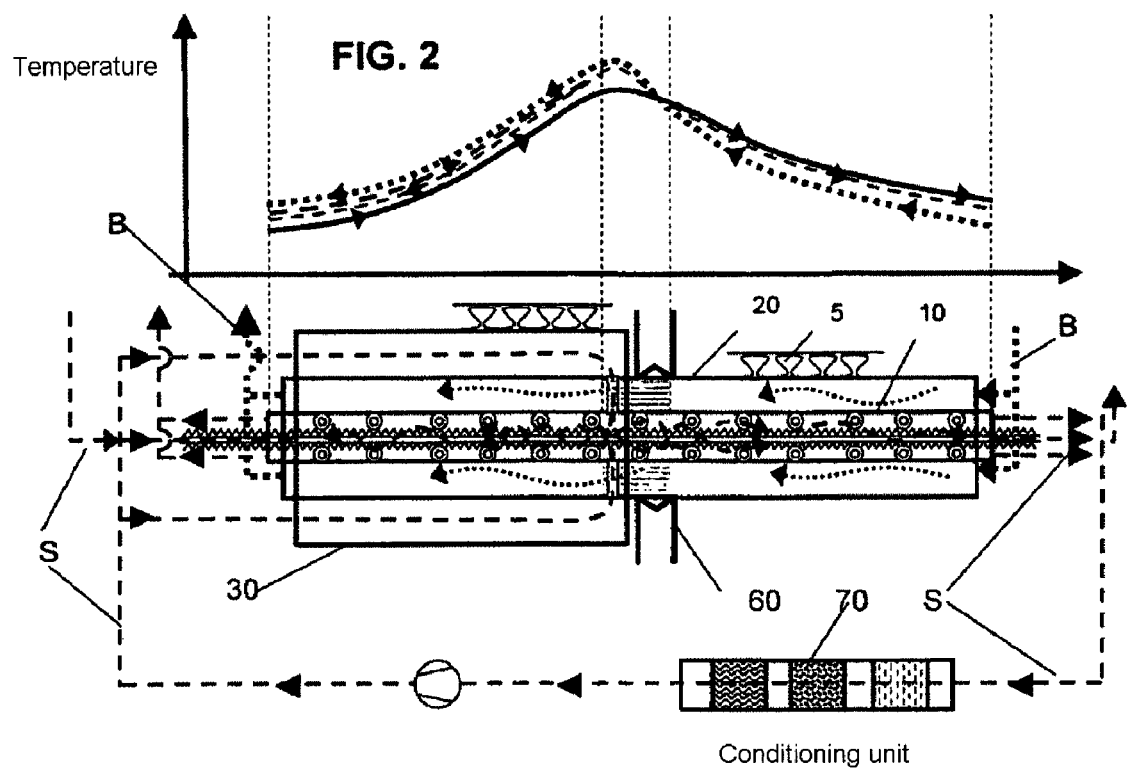
FIG. 2 shows a second principle diagram of an installation, with associated temperature profile.

The installations shown in FIGS. 1 and 2 may be soldering installations, such as for example CAB brazing installations, or installations for the heat treatment of preferably metallic workpieces. The workpieces may also be individual pieces which pass through the installation continuously or discontinuously and are correspondingly treated as they do so.

Figure 4:
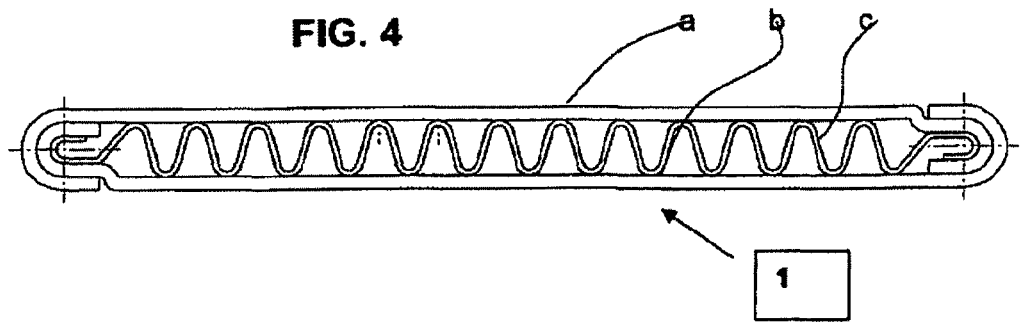
FIG. 4 shows the cross section of a preferred flat tube.
Figure 5:
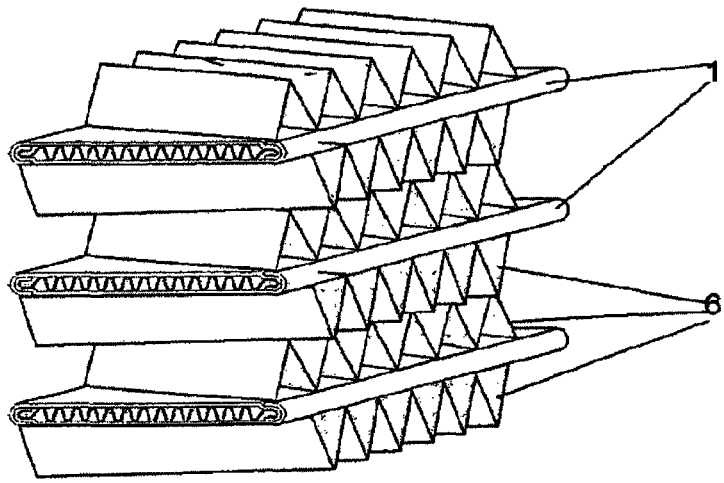
FIG. 5 shows a heat exchanger mesh composed of flat tubes and ribs.

The installation according to FIGS. 1 and 2 is composed of two pipes 10, 20 arranged coaxially with respect to one another. The protective gas atmosphere, for example nitrogen, is situated in the inner pipe 10, which protective gas atmosphere is formed by the protective gas flow S (arrows with dashed lines) flowing from left to right through said pipe 10. Also situated in said inner pipe 10 is the transporting device 2, which is illustrated by numerous roll sets. The workpiece 1 runs between the roll sets, which workpiece 1, in the exemplary embodiment shown, is an endless flat tube composed of aluminum or a suitable aluminum alloy, as shown for example in cross section in FIG. 4, or else is a flat tube on whose two wide sides are already placed ribs 6, likewise composed of aluminum sheet, which are to be soldered to said wide sides. This is also shown in purely schematic form in FIG. 1. There, the flat tube produced from three endless sheet-metal strips a, b, c, with two sheet-metal strips a, b forming the wall and the third sheet-metal strip c constituting an inner part of the flat tube, is to be soldered together and, at the same time, the ribs 6—if present—are to be soldered to the outside. The applicant would like to make reference in this regard to the older German patent application with the file reference DE 10 2006 002 932.1, in which, after the soldering, subsections composed of a flat tube and two corrugated ribs 6 are cut off and used further to produce a heat exchanger. FIG. 5 shows a detail of a heat exchanger mesh, for example for a coolant cooler. The ribs 6 through which cooling air flows have been arranged in said heat exchanger mesh such that the corrugations of the ribs 6 which bear against one another cross between two flat tubes 1, which can increase the heat-exchanging efficiency of the heat exchanger.

In the exemplary embodiment to be described here, the soldering installation is to be coupled to a roll train which is likewise illustrated in schematic form in FIG. 6. Said illustration has been taken from the older patent application with the file reference DE 10 2006 033 568.6. The soldering installation according to FIG. 1 is situated for example at the position shown in FIG. 6, at any rate with its outlet 4 before the cutting station A for individual flat tubes and with its inlet 3 pointing toward the roll train in order to be able to receive the approaching flat tube 1.

It need not be explained in any more detail that, for the purpose of soldering, the endless flat tube 1 is subjected to corresponding pre-treatment such as degreasing, if appropriate fluxing, drying etc. The use of flux should however be avoided as far as possible. Furthermore, it should however be mentioned that the flat tube may be one with an extremely small tube wall thickness in the range from 0.03-0.15 mm. The thickness of the inner part is no greater than 0.03-0.1 mm. Such flat tubes constitute a low thermal mass, which in the present context is expedient for the heating-up process.

Returning to FIG. 1, from which it can also be seen that the combustion gas or heating gas flow B (arrows with dotted lines) flows from right to left through the annular chamber 15 between the abovementioned inner pipe 10 and the outer pipe 20. Therefore, in flow terms, the protective gas flow S and the combustion gas flow B are in counterflow configuration. The pipe wall 11 of the inner pipe 10 has the best possible heat-conducting properties in order that the heat energy can be transmitted quickly and efficiently from the combustion gas flow B to the protective gas flow S and vice versa. A cross section of the installation has not been shown. The pipes 10, 20 may—but need not imperatively—have a circular cross section. A catalytic converter K is indicated by parallel dashes in the annular chamber 15, approximately in the center of the soldering installation. The surface of the plates is coated for example with platinum, a high-grade metal which produces the actual catalytic action. The combustion gas flow B which has already been pre-heated by the approaching protective gas flow S impinges on and flows through the catalytic converter K. A relatively abrupt exothermic reaction takes place there, which reaction is associated with a drastic temperature rise resulting from a catalyzed combustion reaction. An electric assistance or starter heater 60 is arranged on the catalytic converter K, which assistance or starter heater 60 activates the catalytic converter K, that is to say raises the temperature of the catalytic converter K to the catalytic ignition temperature of the combustion gas. After the ignition, the electrical heater 60 may be switched off. Accordingly, the region of the catalytic converter K also has situated in it that region of the inner pipe 10 in which the highest temperatures prevail in the protective gas flow S, and where the soldering of the workpiece 1 ultimately takes place. The combustion gas B which is burned in the catalytic converter K, that is to say the waste gas, still has a very high temperature there. Said combustion gas B is at any rate highly suitable for pre-heating the protective gas flow S arriving in the inner pipe 10 from the inlet 3. The waste gas B leaving the soldering installation at the left-hand side of FIG. 1 still has a temperature in the range from approximately 60-100° C. The "consumed" protective gas S approaching from the right-hand side is also in said temperature range, and said protective gas S is recirculated from there for re-use. A feed device 50 has been indicated in the insulated recirculation line. It will be ensured that highly contaminated protective gas S is not recirculated or is firstly cleaned. A sufficient quantity of new protective gas S is therefore added to the circuit. In FIGS. 1 and 2, a conditioning unit 70 is indicated which may have, in the direction of the flowing protective gas S, a filter, a getter and a further catalytic converter in order to re-condition the protective gas S, that is to say for example to filter out harmful constituents or cause said harmful constituents to react to form non-harmful constituents, and/or in order to add additives which assist in the heat treatment. The getter may be provided in the form of a chemically reactive material which, during soldering, serves to reduce the partial pressures of undesired trace gases in the protective gas S, for example of oxygen, by chemical bonding or sorption to the getter material, for example graphite.

Furthermore, it is also possible here for suitable constituents to be added to the protective gas S, which constituents contribute to the exothermic reaction directly at the soldering points, as mentioned in the introduction (WO 2007/054306). For this purpose, a sufficient quantity of a substance which reacts exothermically is provided at the soldering points. Therefore, the process proposed here may also be combined with processes known per se and lead to further energy savings.

Figure 3:
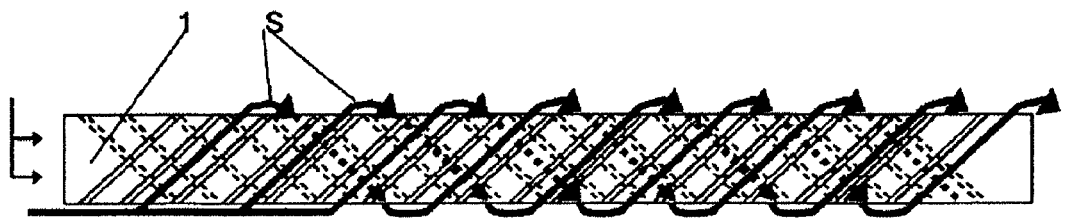
FIG. 3 shows a flat tube with the protective gas flow flowing over it.

The insulation 5 which extends around the outer pipe 20 has merely been indicated. Numerous other details have not been illustrated in the figures. For example, it is self-evident that both the combustion gas flow B and also the protective gas flow S may undergo corresponding deflections, for example may have a serpentine flow path. FIG. 3 is intended to show the spiralling flow of the protective gas S around only one section of the flat tube 1.

FIG. 2 differs from the exemplary embodiment according to FIG. 1 in that the protective gas flow S is conducted into the installation approximately in the center of the latter. For this purpose, the installation is fitted with a further (larger) pipe 30 which, however, extends only up to the introduction point of the protective gas S, that is to say need not extend over the entire length of the installation. Here, too, the protective gas S flows in counterflow configuration in relation to the combustion gas B, and here is pre-heated by the hot combustion gas B or by the waste gas, since the pipe wall of the pipe 20 is also designed to have good heat conductivity in said region. In the exemplary embodiment shown, the pre-heated protective gas flow S is conducted into the inner pipe 10 through the central pipe 20 in the region of the catalytic converter K, and propagates to the left and to the right in the inner pipe 10. This design has inter alia the advantage that the protective gas flow S cannot be contaminated, but is nevertheless sufficiently pre-heated, before entering the hot zone.

FIGS. 1 and 2 also show, by means of three curves, the associated temperature profiles of the combustion gas flow B, of the protective gas flow S and of the flat tube 1 from the inlet 3 to the outlet 4 from the soldering installation. It can be seen from these that the temperatures lie approximately between 60 and 100° C. at the inlet 3 and at the outlet 4, as already mentioned above. Said temperatures may however also lie in the region of the ambient temperature, that is to say lower than that specified. In the central soldering region of the installation, on account of the exothermic reactions taking place there in the combustion gas flow B, it is possible for temperatures to be present there which lie even above the actual soldering temperature for aluminum materials. The inventor is working toward realizing throughput speeds of 100 m/min and higher.

Consumed protective gas S may also be added to the combustion gas mixture B in order to adjust the heat capacity of the latter, ultimately also in order to achieve even more economical energy consumption.

The invention claimed is:

1. A method for soldering or for the heat-treatment of workpieces in a protective gas atmosphere, the method comprising:
conducting a first gas flow that includes a combustion gas into a first inlet, through an installation, and out of a first outlet, wherein the first gas flow travels in a first flow direction;
conducting a second gas flow separate from the first gas flow into an into a second inlet, through the installation, and out of a second outlet, wherein the second gas flow travels in a second flow direction, opposite the first flow direction;
heating the first gas flow exothermically reacting the combustion gas; downstream of the heating gas flow in the first flow direction transferring heat to the second gas flow from the first gas flow proximate the first outlet; and
upstream of heating the first gas flow in the first flow direction transferring heat to the first gas flow from the second gas flow proximate the first inlet,
wherein the first gas flow and the second gas flow are conducted into the installation in opposite flow directions and are placed in a counterflow heat-exchanging relation such that, the first gas flow pre-heats the second gas flow adjacent the first outlet and the second inlet and the second gas flow pre-heats the first gas flow adjacent the first inlet and the second outlet.

2. The method as claimed in claim 1, wherein the first gas flow is a combustion gas mixture and is brought into contact with a catalytic converter.

3. The method as claimed in claim 1, wherein the second gas flow includes a protective gas and is conducted into a first pipe, and wherein the first gas flow is conducted into an annular chamber between the first pipe and a second pipe of the installation.

4. The method as claimed in claim 3, wherein the second gas flow is firstly conducted into a third pipe which surrounds the second pipe, and is conducted into the first pipe only at an approximately central position of the installation.

5. The method as claimed in claim 1, wherein second gas flow emerging from the second outlet installation is re-circulated to the second inlet into the installation.

6. The method as claimed in claim 1, wherein at least constituents of the second gas flow are added to the first gas flow.

7. The method as claimed in claim 1, further comprising moving a workpiece through the installation and transferring heat to the workpiece.

8. The method as claimed in claim 1, wherein moving the workpiece through the installation includes moving the workpiece in the first direction.

9. The method as claimed in claim 1, further comprising insulating the first gas flow between the first inlet and the first outlet.

10. The method as claimed in claim 9, further comprising insulating the second gas flow between the second inlet and the second outlet.

11. The method as claimed in claim 1, further comprising flowing the first gas flow across a catalytic converter and heating the first gas flow by flowing the first gas across the catalytic converter.

* * * * *